United States Patent
Enterante

[11] 3,770,017
[45] Nov. 6, 1973

[54] MIXING VALVE
[76] Inventor: Frank V. Enterante, 5142 Alhambra Ave., Los Angeles, Calif. 90032
[22] Filed: Aug. 30, 1971
[21] Appl. No.: 175,961

[52] U.S. Cl. ........ 137/625.17, 137/625.4, 137/637.4
[51] Int. Cl. ............................................. F16k 11/02
[58] Field of Search .............................. 4/191, 192; 137/625.17, 625.4, 637.4

[56] References Cited
UNITED STATES PATENTS

| | | |
|---|---|---|
| 2,501,657 | 3/1950 | Barkelew ........................ 137/625.17 |
| 3,385,324 | 5/1968 | Wolf et al. ..................... 137/637.4 X |
| 2,839,081 | 6/1958 | Wolf ................................ 137/637.4 |
| 3,011,520 | 12/1961 | Barkelew ........................ 137/625.17 |
| 2,843,150 | 6/1958 | Goodwin .......................... 137/625.4 |
| 3,559,684 | 2/1971 | Rudewick ....................... 137/625.17 |

*Primary Examiner*—Alan Cohan
*Assistant Examiner*—Gerald A. Michalsky
*Attorney*—Forrest J. Lilly

[57] ABSTRACT

A mixture control hot and cold water valve, with one handle for volume control and one for mixture control, is described. A longitudinally ported, rotatable and axially movable valve plug, operable by two concentric stems, controls mixture by rotation of a valve element between hot and cold inlets, and volume by axial travel between an open position and a closed position wherein a washer on the stem is engaged with a seat in the valve housing around the valve plug. The washer is on a washer-carrier having a screw threaded connection to the valve, and also to an inner stem member, whose extremity carries a volume control knob. A handle rotates the outer stem member through a limited arc to correspondingly rotate the valve plug and thus accomplish mixture control. A tubular boss projects from the valve body around the stem means, and a barrel screwed thereto houses substantially the remainder of the stem means. A ferrule screwed onto this barrel acts through a packing to yieldingly resist rotation of an outer stem member relative to the barrel. Thus the outer stem member can be turned for mixture control. By taking off the handles, and screwing off the ferrule, the stems, together with washer-carrier and valve rotor can be pulled out of the valve body and the barrel for easy inspection or repair of the washer.

4 Claims, 8 Drawing Figures

PATENTED NOV 6 1973 3,770,017
SHEET 1 OF 2
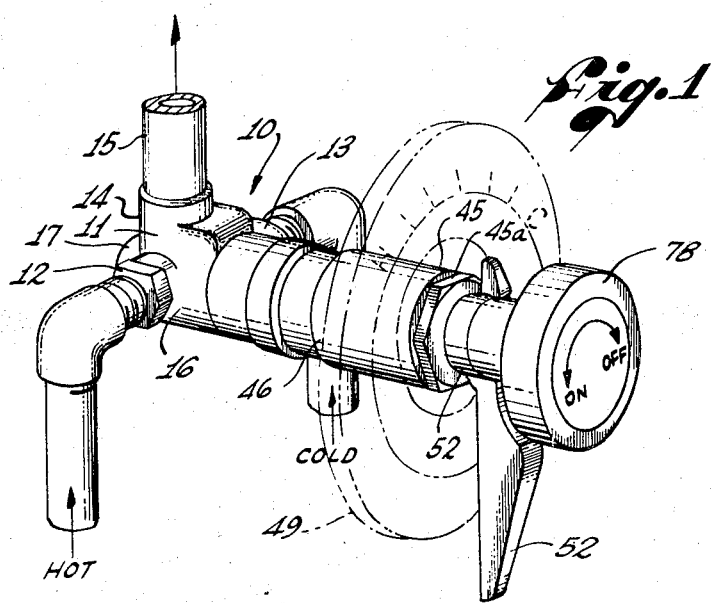
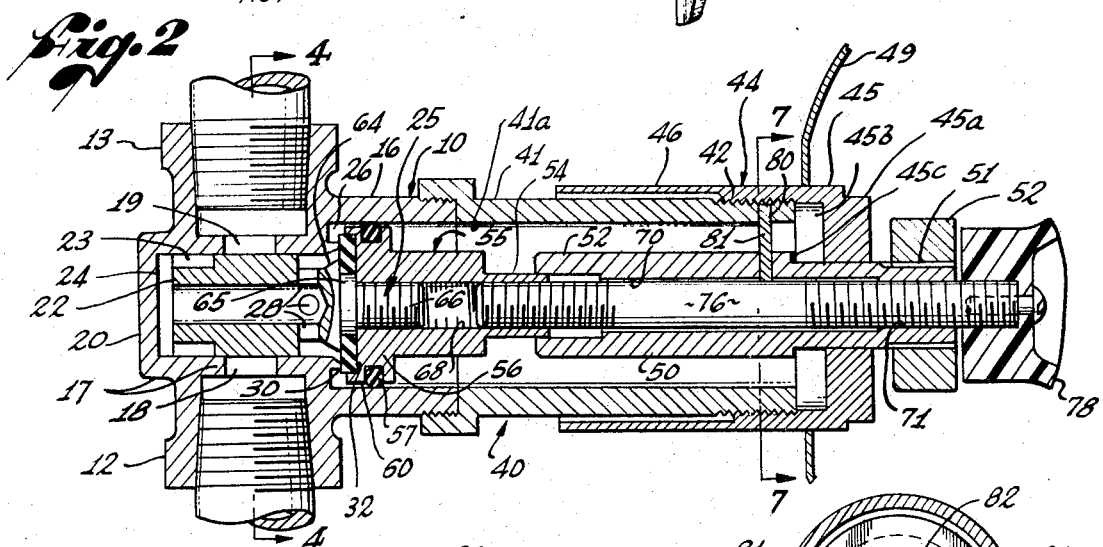
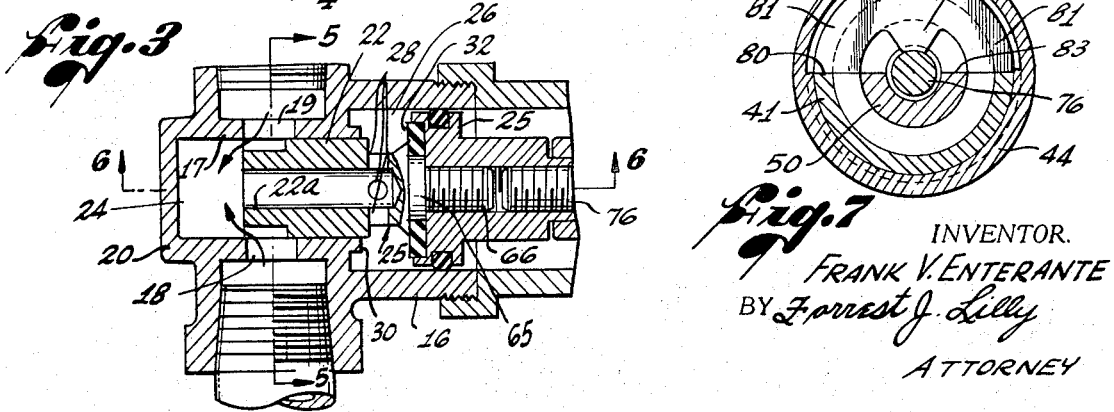
INVENTOR.
FRANK V. ENTERANTE
BY Forrest J. Lilly
ATTORNEY

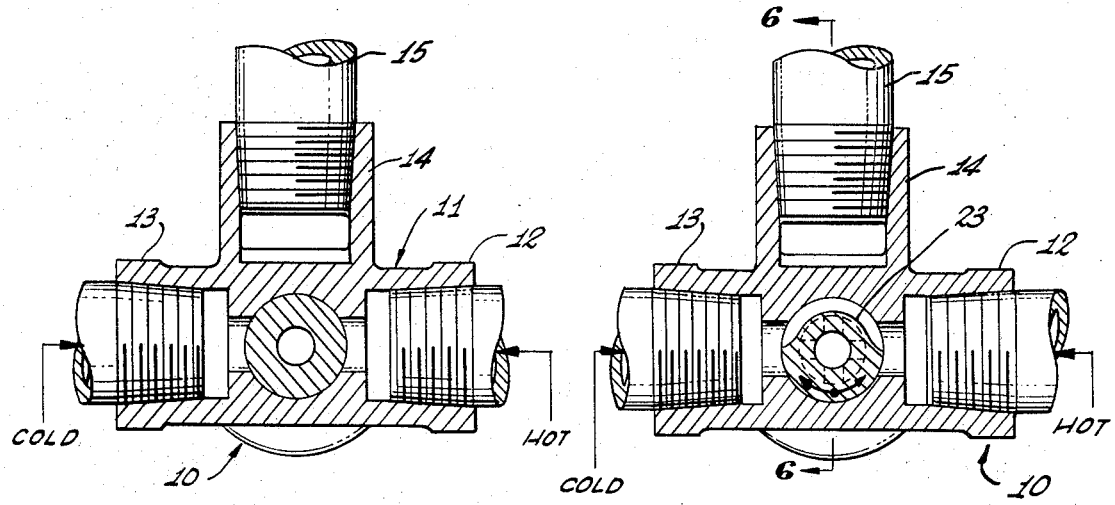
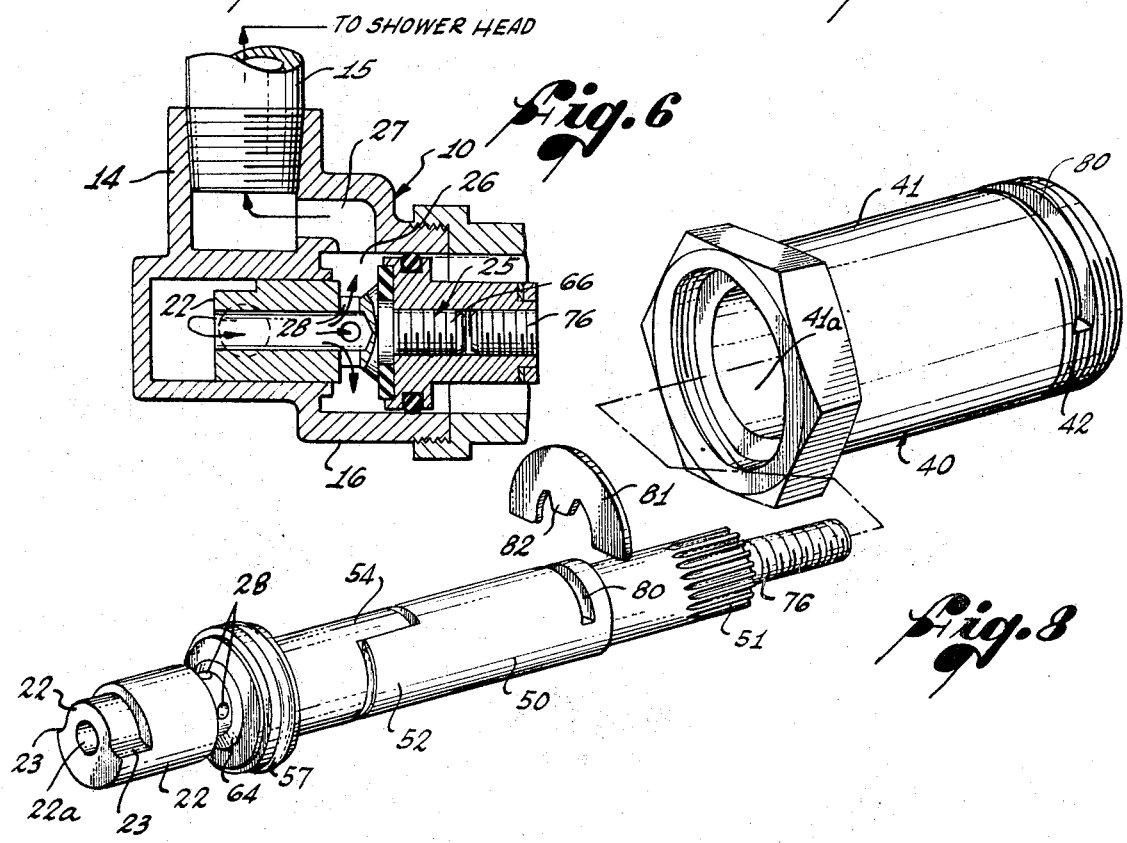

3,770,017

MIXING VALVE

FIELD OF THE INVENTION

This invention relates generally to mixing valves of the class in which one valve handle controls flow volume, and another controls the proportion of one fluid to another, such as the ratio of hot to cold water. More particularly, but without necessary limitation thereto, the invention relates to hot and cold water mixing valves for shower installations, and is so described and illustrated herein for exemplary purposes.

BACKGROUND OF THE INVENTION

Mixing valves of the present general class are known. For example, see prior U.S. Pat. Nos. 3,011,520 and 3,245,430. The present invention seeks to provide an improved valve of this having an improved shutoff seal, relatively easily accessible for inspection or replacement, improvement flow paths and an improved seal arrangement which is effective against leakage along the valve stem when the main shutoff seal is open or ineffective, improved internal construction and arrangement facilitating assembly and disassembly, sealing and packing, and washer inspection and replacement, and improved mounting arrangements.

The novel features of the invention by which these purposes are carried out will best be left for discussion in connection with a detailed description of a present illustrative embodiment of the invention now to be described.

BRIEF DESCRIPTION OF THE DRAWINGS

FIG. 1 is a perspective view of the valve in accordance with the invention;

FIG. 2, is a longitudinal medial section of the valve of FIG. 1;

FIG. 3, is a view of a portion of FIG. 2, but with the parts moved from shutoff to open position;

FIG. 4, is a section on line 4—4 of FIG. 2;

FIG. 5, is a similar view on line 5—5 of FIG. 3;

FIG. 6, is a section taken on line 6—6 of FIG. 5;

FIG. 7, is a view taken on line 7—7 of FIG. 2; and

FIG. 8, is a view in exploded perspective showing internal parts of the valve.

DESCRIPTION OF AN ILLUSTRATION

In the drawings, the reference numeral 10 designates the valve of the invention generally. This valve has a valve body or housing 11 provided with lateral hot and cold water inlets 12 and 13, respectively, spaced 180° apart, and a mixture outlet 15 midway between the inlets 12 and 13. FIG. 1 shows the valve in its normal position of installation. The housing has a generally cylindric housing wall 16, whose longitudinal axis intersects the axes of inlets 12 and 13 and outlet 14 at right angles. This longitudinal axis is the stem axis of the valve; and the housing wall 16 has a reduced coaxial cylindrical wall 17, defining a cylindric valve chamber bore, the wall 17 having diametrically opposite ports 18 and 19 aligned and communicating with the inlets 12 and 13. Cylindrical wall 17 has a closed end wall 20, and opens at its other end inside the cylindric, larger diameter wall portion 16.

A cylindrical valve plug or rotor 22 is rotatable in the chamber or bore of cylindrical wall 17. Its exterior periphery is cut away to form a circumferential groove 23, just outside the ports 18 and 19 with the rotor in the closed position of FIG. 2. This groove 23 extends throughout an arc of 180° (FIG. 5). As the valve rotor is moved axially to the right from the position of FIG. 2, the groove 23 cracks openings into ports 18 and 19 and then opens these wider and wider until the groove 23 is a full register therewith (FIG. 3). The groove 23 thus provides flow channels into mixing chamber 24 inside wall 17 between the end wall 20 and the valve plug 22. Thus, total flow from the ports 18 and 19 into the chamber 24 is increased from shutoff to maximum as the valve rotor is moved axially from the position of FIG. 2 to that of FIG. 3; and it will be evident from FIG. 5 that the ratio of the flows from ports 18 and 19 will be adjusted as the valve rotor is rotated.

The valve rotor 22, which is longitudinally bored, as at 22a, is reduced in diameter just beyond the juncture of cylindrical wall 17 with larger diameter cylindrical wall 16, to form a ported stem 25 which protrudes into the interior mixture space 26 inside of wall 16, and this space 26 communicates via a passage 27 in housing 11 with mixture outlet 14 (FIG. 6).

The valve rotor stem 25 has immediately adjacent the end of the valve rotor 22, a series of ports 28 establishing communication between port or bore 23 and the space 26, and therefore with channel 27 and mixture outlet leading to the shower head. The angular position of the valve plug, having reference to its cutout channel 23, of course, determines the proportion of hot to cold water permitted to enter the mixing chamber from the hot and cold inlets.

Facing into space 26, around the bore of cylindrical wall 17, is an annular valve closure seat 30, adapted to seat and form a sealing closure with a rubber sealing washer 32.

Screwthreadly joined to the cylindrical wall 16 of the valve housing is a bonnet 40 embodying an elongated barrel 41 whose bore 41a is a continuation of the bore of wall 16. Wall 16 and barrel 41 may in fact be regarded as one barrel. Preferably, however, from the standpoint of structure, the cylindrical wall 16 is used as a male fitting, screwthreaded as at 42, externally into a box on the end of barrel 41, and with the bores of members 16 and 41 coaxial and equal in diameter. A ferrule 44 encircles barrel 41, and has a nut part 45 with a hexagonal head 45a screwed onto the threaded extremity of the barrel 41. A packing ring 45b is placed between the inner end of the bore in the ferrule and the extremity of barrel 41, as shown. It may be compressed as desired by tightening the ferrule on the threads 42 of barrel 41. The ferrule includes a rearwardly extending skirt 46, which may be spaced annularly outside the barrel 41 rearwardly of its threaded extent; and the entire exterior surface of the ferrule is finished, as by chrome plating, for sake of appearance.

It will be understood that this ferrule protrudes through an opening made in the wall of the shower room, and is surrounded by an escutcheon plate 49, which may be thus located at any point along the ferrule, depending upon the location of the exterior shower room wall surface relative to the valve. The long ferrule will be seen to facilitate installation, in that it affords very large leeway as to the location of the valve in back of the finished shower room wall surface.

Rotatable inside barrel 41 is a tubular shaft or stem 50, and as will be seen, the outer extremity of the ferrule fits closely over a reduced portion of this stem. Beyond the ferrule the stem 50 has serrations 51, and a hot-and-cold control handle 52 has a complementary serrated aperture which fits over the serrated stem 50. The inner end portion of tubular stem 50 is laterally slotted to provide parallel tines 52, which slidably receive between their opposed parallel flat faces a flat sided lug 54 on the inner extremity of a washer carrier 55. The latter has a piston head 56 slidably fitted in the end portion of the bore of cylindrical housing part 16, an O-ring seal 57 being placed between these parts. The piston head 56 of member 55 is formed as a cup 60, which seats the aforementioned rubber washer 32 and positions it for engagement with, or retraction from, the shutoff seat 30. The aforementioned valve rotor stem 25 has, beyond ports 28, a frusto-conical flange 64 engaging an inner portion of the washer 32, and therebeyond, a neck 65 fitting inside the washer. Beyond the washer, the stem 25 has a threaded extremity 66, with left-hand threads engaged with left-hand threads in a central bore 68 through the washer carrier 55.

The tubular shaft or stem 50 has an unthreaded bore 70, which meets a reduced right hand threaded bore 71 at its "handle-end" extremity. A center stem 76 is located inside hollow stem 50 and washer carrier 55. It has right-hand threads engaged with the right-hand threads of bore 71 of tubular stem 50, and left-hand threads engaged with the left-hand threads in bore 68 of carrier 55. On the handle-end extremity is tightly mounted an OFF and ON knob 78.

Rotation of tubular stem 52 by handle 50 to proportion the flow of hot to cold water is limited, as now to be described. Bonnet sleeve 41, as well as stem 50, have a 180° slot 80, in which is fitted a key or semi-annulus 81, a lug 82 at the middle of the inside curve thereof engaging an unthreaded area of the threaded stem 76, so that, with the ferrule 44 in place, the key or half-ring 81 will remain confined in the slot 80. The tubular shaft 50 has a 180° slot 83, which receives the lug 82, and the ends of which, by engagement with opposite ends of this lug, thus function as end limits to angular swing of HOT and COLD water handle 52 and the valve rotor controlled thereby.

Operation is as follows: The position of FIG. 2 is with the washer 32 seated on seat 30. Depending upon the adjustment of handle 52, hot and cold water entering at inlets 12 and 13 is shut off (though not sealed) by the periphery ofthe valve rotor, which is then in an axial of the such as to block ports 18 and 19. Any water leaking past the rotor is sealed by washer 32. To open the valve, knob 78 is rotated in a counter-clockwise direction, thus rotating center stem 76 correspondingly. The threaded right-hand end portion of stem 76 thus turns in the threaded bore 71 in the corresponding end of tubular stem 50; and since tubular stem 50 is blocked against axial travel by the aforementioned key member 81, and further, is restrained against rotation by the frictional resistance exerted by the fabric "duck packing" ring 45b, compressed by tightening of ferrule 45 thereagainst, the result of this rotation of the knob 78 is to screw the center stem 76 outwardly of the stationary tubular stem 50, i.e., toward the right in FIG. 2. Further, the left-hand threads on stem 76 engaging in the left-hand threads in the washer carrier, which resists rotation along with stem 50 by being keyed thereto, moves the washer carrier 55 and washer 32 axially off the seat 35, i.e., also toward the right. The rate of this axial travel is evidently double what would be obtained by a lead screw turning in a nut, because the stem 76 has two right and left-hand threaded portions of tubular stem 50 and carrier 55. This double travel feature, however is not novel per se.

The shutoff washer 32 is thus moved rapidly off its seat by the knob 78, and the flow channels from inlet ports 18 and 19 are rapidly opened.

The proportion of hot to cold water is controlled by the position of handle 52, which controls the relative openings through the groove 23 to the inlet and outlet ports 18 and 19. When the valve is open, the flow paths for the hot and cold water streams are as shown by the arrows in FIGS. 3 and 6. The water is effectively sealed in the position of FIGS. 1 and 2; and when the valve is opened (FIG. 3), the flow paths to the outlet 14 are wide and unrestricted. Leakage past the head 56 of the washer carrier is prevented by O-ring 57 when the valve is open. Rotation of handle 52 requires limited rotation of hollow stem 50, within the limits set by the half-round slot 83 in the hollow stem 50 and key lug 82 movable therein. This rotation of stem must take place against the yielding restraint of the compressed washer 45a. To ease the turning resistance to a desirable extent a thin bronze washer 45c may be placed around the stem 50 at the shoulder thereon so as to engage a narrow width of the washer 45b. The stem 50 is then still yieldingly restrained, but can turn suitably for smooth performance.

A feature of the invention is the facility with which the valve can be removed from its shower wall mounting for inspection or repair, particularly inspection or replacement of its washer 32. As will be seen, the ferrule 44 can be turned by its hexagonal nut portion, so as to remove it from the end of the barrel 41. The key 81 is thus exposed and can be removed after which the entire inside assembly, beginning with the knob 78 and ending with the valve rotor 22, simply slides out of the valve housing 11 and barrel 41 screwed thereto. There is no need to disassemble the barrel 41 from the housing 11. Thus, the washer 32, as well as the O-ring 57, may be easily inspected and replaced if found worn.

It will be understood that the particular embodiment of the invention herein disclosed and described in some detail is for example only, and that various changes in design, construction and arrangement may be made without departing from the spirit and scope of claims appended hereto.

What is claimed is:

1. In a mixing valve:
    a valve body comprising walls providing hot and cold water inlets, a receiving chamber for receiving and mixing water from both said inlets, a cylindrical valve chamber bore communicating at one end with said receiving chamber, a dis-charge chamber communicable with the other end of said valve chamber bore, a projecting barrel around said discharge chamber and extending coaxially with reference to said valve chamber bore, and a mixture outlet passage leading from said discharge chamber in said barrel;
    a cylindrical valve rotor with a longitudinal blind bore therein rotatable and longitudinally slidable in said valve chamber bore, the open end of said blind bore opening through one end of said rotor to said receiving chamber;

a seal ring carrier secured to the opposite end of said valve rotor, and sealed and axially movable in the bore in said barrel;

a seal ring on the end of said carrier confronting said valve bore and adapted to seal against a circular sealing area around said valve bore by axial travel of said carrier;

there being a radial outlet opening in said valve rotor leading from the inner end of said blind bore and communicating with said mixing chamber when said seal ring is off said circular sealing area;

said mixture outlet passage leading from said mixing chamber from a point beyond said circular sealing area on which said seal ring is sealable around said valve chamber bore;

said valve rotor embodying control means adapted to simultaneously meter the fluid flows from said inlets therepast in opposite sense by virtue of rotation thereof, and to simultaneously meter the fluid flows from said inlets therepast in the same sense by virtue of axial movement thereof;

the flow of water through the valve being shut off upon axial travel of said seal ring carrier and valve rotor to a position of engagement of said seal with said circular sealing area annular seat;

a first stem means protruding through said barrel for axially moving said valve rotor;

a second stem means protruding through said barrel for rotating said valve rotor;

a ferrule screwed on the end of said barrel remote from the screwthreaded junction of the barrel with said tubular part, said ferrule including an end wall spaced beyond the end of said barrel and having a central bore therethrough;

said second stem means including a bored shaft rotatable adjacent one end thereof in said end wall of said ferrule, and operatively connected at the other end thereof to said seal ring carrier for relative axial travel but against rotation relative to one another;

said first stem means including a center shaft within said bored shaft of said second stem means screwthreaded at one end into said seal ring carrier, and at its opposite end, with threads of opposite hand, into said bored outer shaft of said second stem means; and means associated with said ferrule exerting on said second stem means a yielding resistance to rotation of said second stem means in accordance with the tightness with which said ferrule is screwed onto said barrel.

2. In a mixing valve:

a valve body comprising walls providing two inlets for two fluids, a mixture outlet, and a cylindrical valve chamber bore communicating at one end with said fluid inlets and at the other with a mixing chamber;

a valve rotor with a longitudinal blind bore therein rotatable and axially movable in said valve chamber bore, the open end of said valve bore being in communication with the end of said valve chamber bore receiving said fluids from said two inlets;

a barrel projecting from said valve body coaxially with the axis of said valve chamber bore, said barrel having a bore with a diameter larger than the diameter of said valve chamber bore;

a seal ring carrier secured end-to-end to said valve rotor, and sealed and axially movable in said bore of said tubular part, and a replaceable seal ring on the end of said carrier confronting said valve chamber bore and adapted to seal therearound;

the bore in said barrel and said carrier together with a confronting face on said valve body around said valve chamber bore defining a mixture chamber;

there being fluid passage means for conveying fluid from said inlets to and through said valve and over said annular seat to said mixture chamber, and from said chamber to said mixture outlet;

said valve rotor embodying control means adopted to simultaneously meter the fluid flows from said inlets therepast in opposite sense by virtue of rotation thereof, and to simultaneously meter the fluid flows from said inlets therepast in the same sense by virtue of axial movement thereof;

the flow of fluid through the valve being shut off upon axial travel of said seal ring carrier and valve rotor to a position of engagement of said seal with said annular seat;

a first stem means protruding through said barrel for axially moving said valve rotor;

a second stem means protruding through said barrel for rotating said valve rotor;

a ferrule screwed on the end of said barrel remote from the screwthreaded junction of the barrel with said tubular part, said ferrule including an end wall spaced beyond the end of said barrel and having a central bore therethrough;

said second stem means including a bored shaft rotatable adjacent one end thereof in said end wall of said ferrule, and operatively connected at the other end thereof to said seal ring carrier for relative axial travel but against rotation relative to one another;

said first stem means including a center shaft within said bored shaft of said second stem means screwthreaded at one end into said seal ring carrier, and at its opposite end, with threads of opposite end, into said bored outer shaft of said second stem means;

a shoulder on said bored shaft facing away from said valve body;

a packing within said ferrule buttressed by said ferrule end wall engaging said shoulder and the end of said ferrule;

said ferrule being screwed onto said barrel with sufficient tightness to hold the parts in snug assembly but with sufficient looseness to permit rotation of said second stem means relative to said barrel.

3. The subject matter of claim 2, including also a key mounted to said barrel and having engaging in a transverse slot in said bored shaft of said second stem means to afford limit stop means for rotation of said second stem means relative to said barrel.

4. The subject matter of claim 2, wherein said bore in said barrel is at least as great in diameter as the outside diameter of said seal ring carrier.

* * * * *